(12) United States Patent
Uehata et al.

(10) Patent No.: US 9,902,022 B2
(45) Date of Patent: Feb. 27, 2018

(54) FLUX AND SOLDER PASTE

(71) Applicant: Senju Metal Industry Co., Ltd., Tokyo (JP)

(72) Inventors: Masashi Uehata, Osaka (JP); Yasuyuki Yamagawa, Osaka (JP); Kazuya Kitazawa, Saitama (JP); Yoshinori Takagi, Saitama (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 15/128,231

(22) PCT Filed: Feb. 27, 2015

(86) PCT No.: PCT/JP2015/055781
§ 371 (c)(1),
(2) Date: Mar. 2, 2017

(87) PCT Pub. No.: WO2015/146473
PCT Pub. Date: Oct. 1, 2015

(65) Prior Publication Data
US 2017/0190005 A1 Jul. 6, 2017

(30) Foreign Application Priority Data
Mar. 25, 2014 (JP) .................................. 2014-062417

(51) Int. Cl.
| B23K 35/362 | (2006.01) |
| B23K 35/26 | (2006.01) |
| B23K 35/36 | (2006.01) |
| B23K 35/02 | (2006.01) |
| C22C 13/00 | (2006.01) |

(52) U.S. Cl.
CPC .......... B23K 35/362 (2013.01); B23K 35/025 (2013.01); B23K 35/262 (2013.01); B23K 35/264 (2013.01); B23K 35/36 (2013.01); B23K 35/3613 (2013.01); C22C 13/00 (2013.01)

(58) Field of Classification Search
CPC .............................. B23K 35/362; C22C 13/00
USPC ......................................................... 148/23
See application file for complete search history.

(56) References Cited

U.S. PATENT DOCUMENTS

| 6,641,679 | B2 | 11/2003 | Nishina et al. |
| 6,768,197 | B2 | 7/2004 | Hosomi et al. |
| 6,915,944 | B1 | 7/2005 | Takaya et al. |
| 6,971,163 | B1 | 12/2005 | Craig et al. |
| 7,601,228 | B2 | 10/2009 | Nishina et al. |
| 8,070,043 | B1 | 12/2011 | Fleming et al. |
| 8,227,536 | B2 | 7/2012 | Watanabe et al. |
| 8,430,295 | B2 | 4/2013 | Gallagher et al. |
| 2003/0051770 | A1 | 3/2003 | Nishina et al. |
| 2003/0168123 | A1 | 9/2003 | Wada et al. |
| 2005/0039824 | A1 | 2/2005 | Nishina et al. |
| 2015/0035175 | A1 | 2/2015 | Honda et al. |

FOREIGN PATENT DOCUMENTS

| CN | 1374168 | A | 10/2002 |
| CN | 1433351 | A | 7/2003 |
| CN | 1543385 | A | 11/2004 |
| CN | 101232967 | A | 7/2008 |
| CN | 102554512 | A | 7/2012 |
| CN | 103042320 | A | 4/2013 |
| EP | 1231016 | A1 | 8/2002 |
| EP | 1946882 | A1 | 7/2008 |
| JP | 2000219653 | A | 8/2000 |
| JP | 2001170797 | A | 6/2001 |
| JP | 2001219294 | A | 8/2001 |
| JP | 2002512278 | A | 4/2002 |
| JP | 2002239785 | A | 8/2002 |
| JP | 3791403 | B2 | 6/2006 |
| JP | 2012115871 | A | 6/2012 |
| TW | 200730288 | A | 8/2007 |
| TW | 201335302 | A1 | 9/2013 |
| WO | 2006064849 | A1 | 6/2006 |
| WO | 2007018288 | A1 | 2/2007 |

Primary Examiner — Weiping Zhu
(74) Attorney, Agent, or Firm — The Webb Law Firm

(57) ABSTRACT

Provided is a flux which can remove metal oxides to improve solder wettability and can fix the object to be soldered with flux residue. The flux contains thermosetting resin, and long-chain dibasic acid mixture including one or more species of first long-chain dibasic acid having an alkyl group in a side chain, the first long-chain dibasic acid being added as a hardening agent for hardening the thermosetting resin and an activator, and second long-chain dibasic acid having an alkyl group and an alkoxycarbonyl group in a side chain and having carbon number of 8 or more in a main chain between the carboxyl groups at opposite terminals. It is preferable that content of the thermosetting resin is 30% through 70% and content of the long-chain dibasic acid mixture is 20% through 60%.

6 Claims, No Drawings

FLUX AND SOLDER PASTE

CROSS-REFERENCE TO RELATED APPLICATIONS

This application is the U.S. national phase of International Application No. PCT/JP2015/055781 filed Feb. 27, 2015, and claims priority to Japanese Patent Application No. 2014-062417 filed Mar. 25, 2014, the disclosures of which are hereby incorporated in their entirety by reference.

TECHNICAL FIELD

The present invention relates to a flux which can bond objects to be joined securely with a flux residue and a solder paste in which the flux and solder powder are mixed.

BACKGROUND

The flux used for soldering generally has efficacy to chemically remove any metal oxides from a solder alloy and a metallic surface of an object to be joined which is subject to the soldering and to allow any metallic elements to move from and/or to a boundary between them. Therefore, the soldering using the flux enables intermetallic compounds to be formed between the solder alloy and the metallic surface of the object to be joined, thereby obtaining any strong joining.

On the other hand, components of the flux include any components which cannot be decomposed or evaporated by heating during the soldering and they remain around the soldered parts as the flux residue.

Meanwhile, together with recent advancement of miniaturization of electronic components, an electrode to be soldered in the electronic component becomes also miniaturized. Therefore, an area which can be soldered by the solder alloy is limited so that it may be impossible to get sufficient joining strength by only the solder alloy.

Accordingly, a technology has been proposed in which the electronic component is securely bonded by covering a circumference of the part to be soldered with underfill or resin mold as parts-bonding means for strengthening the joining by the soldering.

Here, when the flux residue remains around the part to be soldered, the flux residue hinders bonding the part to be soldered to the resin, so that it is impossible to maintain the strength thereof. For this reason, it is required to clean the flux residue for covering the circumference of the part to be soldered with the resin. However, it takes time and/or costs to clean the flux residue.

Accordingly, a technology for avoiding the cleaning of the flux residue has been proposed (See, for example, Patent Document 1) in which flux contains any thermosetting resin, electronic components and a substrate which are objects to be joined are securely bonded by the flux residue in which the resin is hardened by heating during the soldering.

DOCUMENT FOR PRIOR ART

Patent Document

Patent Document 1: Japanese Patent Application Publication No. 2001-219294

SUMMARY OF THE INVENTION

Problem to be Solved by the Invention

In the technology to bond the object to be joined securely with the flux residue, it is necessary not to hinder function of the flux for improving solder wettability by removing the metal oxides by addition of the thermosetting resin into the flux and it is also necessary to be able to bond the objects to be joined securely with the flux residue by generating the flux residue with the thermosetting resin.

The present invention resolves such a problem and is to provide a flux which can remove any metal oxides generated on the solder alloy and the metallic surface of the object to be soldered and can improve the solder wettability and allows the objects to be joined to be securely bonded with the flux residue and a solder paste in which the flux and solder powder are mixed.

Means for Solving the Problems

By adding the thermosetting resin into the flux, it is possible to harden the thermosetting resin by heating during the soldering to harden the flux residue and to bond an object which is subject to the soldering and an object to be joined with the flux residue. By adding into the flux into which the thermosetting resin is added long-chain dibasic acid mixture containing one or more species of first long-chain dibasic acid having an alkyl group in a side chain and second long-chain dibasic acid having an alkyl group and an alkoxycarbonyl group in a side chain and having carbon number of 8 or more in a main chain between the carbonyl groups at opposite terminals, it has been found out that the solder wettability is improved without hindering the hardening of the thermosetting resin and hindering the function of the flux to remove the metal oxides by adding the thermosetting resin.

Accordingly, this invention relates to a flux containing thermosetting resin and long-chain dibasic acid mixture being added as a hardening agent for hardening the thermosetting resin and an activator, wherein the long-chain dibasic acid mixture is mixture of the long-chain dibasic acid mixture of compounds having following compositions (1), (2), (3) and (4), and when proportion of whole of the mixture is set to be 100 mass %, the proportion of the long-chain dibasic acid shown in the compositions (1) through (4) is as follows:

(1) 2-methyl nonanedioic acid of 30 mass % through 60 mass %;

(2) 4-(methoxycarbonyl)-2,4-dimethyl undecanedioic acid of 8 mass % through 20mass %;

(3) 4,6-bis(methoxycarbonyl)-2,4,6-trimethyl tridecanedioic acid of 8 mass % through 20 mass %; and (4) 8, 9-bis(methoxycarbonyl)-8,9-dimethyl hexadecanodioic acid of 15 mass % through 30 mass %.

In the flux of this invention, it is still further preferable that content of the thermosetting resin in the flux is 30 mass % through 40 mass % and content of the long-chain dibasic acid mixture in the flux is 20 mass % through 60 mass %.

Further, a solvent of 0.1 mass % through 40 mass % may be added into a flux.

In addition, this invention relates to a solder paste in which flux and solder alloy powder are mixed, the flux containing thermosetting resin and long-chain dibasic acid mixture being added as a hardening agent for hardening the thermosetting resin and an activator, and the long-chain dibasic acid mixture is mixture of the long-chain dibasic acid mixture of compounds having following compositions (1), (2), (3) and (4), and when proportion of whole of the mixture is set to be 100%, the proportion of the long-chain dibasic acid shown in the compositions (1) through (4) is as follows:

(1) 2-methyl nonanedioic acid of 30% through 60%;

(2) 4-(methoxycarbonyl)-2,4-dimethyl undecanedioic acid of 8% through 20%;
(3) 4,6-bis(methoxycarbonyl)-2,4,6-trimethyl tridecanedioic acid of 8% through 20%; and
(4) 8, 9-bis(methoxycarbonyl)-8,9-dimethyl hexadecanodioic acid of 15% through 30%.

It is preferable that in the solder past of this invention, content of the thermosetting resin in the flux is mass 30% through 40 mass % and content of the long-chain dibasic acid mixture in the flux is 20 mass % through 60 mass %.

Effect of the Invention

In the invention, by adding into the flux the thermosetting resin and the long-chain dibasic acid mixture in which 2-methyl nonanedioic acid, 4-(methoxycarbonyl)-2,4-dimethyl undecanedioic acid, 4,6-bis(methoxycarbonyl)-2,4,6-trimethyltridecanedioic acid and 8,9-bis(methoxycarbonyl)-8,9-dimethyl hexadecanodioic acid are mixed, metal oxides formed on the solder alloy and a surface of the objects to be joined are removed so that the solder wettability is improved.

Further, when hardening the thermosetting resin by heating during the soldering, the flux residue is hardened and the hardened flux residue enables the object to be joined to be securely bonded to the joining object. Thereby, in this invention, the function of the flux to remove metal oxides is not hindered by the addition of thermosetting resin nor hardening of the thermosetting resin is hindered.

Accordingly, in this invention, when it is used together with the solder alloy, any excellent solder wettability can be obtained. Further, since the flux residue securely bonds the object to be joined to the object to be joined, any reinforcing effect is obtained.

EMBODIMENTS FOR CARRYING OUT THE INVENTION

The flux according to this embodiment contains epoxy resin which is thermosetting resin, and long-chain dibasic acid mixture being added as a hardening agent for hardening the epoxy resin and an activator. The long-chain dibasic acid mixture includes first long-chain dibasic acid having an alkyl group in a side chain, and second long-chain dibasic acid having an alkyl group and an alkoxycarbonyl group in a side chain and having carbon number of 8 or more in a main chain between the carboxyl groups at opposite terminals. The flux according to this embodiment also contains hardened castor oil for importing thixotropic nature and hardening accelerator for the epoxy resin.

In this embodiment, in the flux, content of the thermosetting resin is set to be 30% through 40%, content of the long-chain dibasic acid mixture is set to be 20% through 60%, content of the solvent is set to be 7% through 37% and the remainder is set to be the hardened castor oil and the hardening accelerator.

The flux according this embodiment is mixed with powder of the solder alloy to form a solder paste. The solder paste according to this embodiment is formed by mixing the flux having compositions described above with the powder of the solder alloy having a composition of 96.5Sn-3.0Ag-0.5Cu (each numerical value indicates mass %). The solder paste is applied to electrode(s) of a substrate which is (are) the object(s) to be joined and an electronic component(s), for example, semiconductor chip, which is (are) the object(s) to be joined, is (are) mounted on the substrate to which the solder paste is applied with the semiconductor chip meeting a position(s) of the electrode(s).

When heating the solder paste during a reflow process, the solder alloy contained in the solder paste is then melted to harden, so that electrode(s) of the semiconductor chip and electrode(s) of the substrate are joined by the solder to each other. The flux contained in the solder paste is also hardened, so that electrode(s) of the semiconductor chip, electrode(s) of the substrate and the solder are securely bonded by the flux residue.

The epoxy resin hardens at a predetermined temperature to hardening the flux residue. The epoxy resin also has any adhesive property between the joining object and the object to be joined. Accordingly, by mainly hardening the epoxy resin contained in the flux, electrode(s) of the semiconductor chip, which is (are) the object(s) to be joined, electrode(s) of the substrate, which is (are) the joining object, and the solder are securely bonded by the hardened flux residue.

As typical epoxy resin, bisphenol type epoxy resin is exemplified. As the bisphenol type, bisphenol A type, bisphenol AP type, bisphenol AF type, bisphenol B type, bisphenol BP type, bisphenol C type, bisphenol E type, bisphenol F type, bisphenol G type, bisphenol M type, bisphenol S type, bisphenol P type, bisphenol PH type, bisphenol TMC type, bisphenol Z type and the like are exemplified. In this embodiment, bisphenol A type was used.

The long-chain dibasic acid mixture removes any metal oxides from a surface of the object to be joined to improve solder wettability. The long-chain dibasic acid mixture also accelerates the hardening of the epoxy resin and imports softness to the hardened flux residue.

It is preferable that the long-chain dibasic acid mixture contains, as the second long-chain dibasic acid, one or more species of long-chain dibasic acid having two or more alkoxycarbonyl groups.

As such long-chain dibasic acid mixture, it is preferable that the long-chain dibasic acid mixture is mixture of any of compounds having following compositions (1), (2), (3) or (4) or a combination of two or more compounds thereof at predetermined proportion.

(1) 2-methyl nonanedioic acid,
(2) 4-(methoxycarbonyl)-2,4-dimethyl undecanedioic acid,
(3) 4,6-bis(methoxycarbonyl)-2,4,6-trimethyl tridecanedioic acid, and
(4) 8, 9-bis(methoxycarbonyl)-8,9-dimethyl hexadecanodioic acid.

Further, when proportion of whole of the mixture is set to be 100%, preferable proportion of the long-chain dibasic acid mixture shown in the above-mentioned compositions (1) through (4) as the mixture is as follows:
(1) 30% through 60%;
(2) 8% through 20%;
(3) 8% through 20%; and
(4) 15% through 30%.

Since it takes long time until the epoxy resin and the long-chain dibasic acid mixture are hardened merely by heating them, any hardening accelerator may be added thereinto in order to shorten the hardening time. As the hardening accelerator, for example, phenolic compound, tertiary amine, quaternary ammonium salt, quaternary phosphonium salt, imidazole, organic acid metal salt, Lewis acid and like are exemplified.

Any solvent may be added to the flux of this application in order to adjust viscosity and to dissolve addition agent.

Regarding the powder of the solder alloy, although the powder having the composition of Sn—Ag—Cu has been used in this embodiment, this invention is not limited to the above-mentioned composition: Powder having another composition may be used. Specifically, Sn-based alloy composed mainly of Sn, Bi-based alloy composed mainly of Bi, In-based alloy composed mainly of In and the like are exemplified. Any one species or more of element selected from a group of elements, Ag, Cu, In, Bi, Ni, Ge, Ga, Co, Fe, Sb, P, Zn, Al, Ti and the like but not contained in the above-mentioned each alloy may be added to each alloy.

EXECUTED EXAMPLES

The fluxes of the executed examples and the comparison examples having the compositions shown in the following Table 1 were prepared and then, tested on the solder wettability and the reinforcing effect thereof. It is to be noted that percentage of each of the compositions shown in the Table 1 is mass %. First, the following will describe an evaluation method of each test.
(1) Regarding Evaluation of Solder Wettability
(a) Evaluation Method
Flux was applied onto Cu plate, solder ball was mounted on the flux applied onto the Cu plate and was reflowed, and then, a diameter of the spread solder was measured. In reflow process, using a reflow apparatus, a peak temperature of which is set to be 250 degrees C., the temperature was increased from 40 degrees C. to 220 degrees by 3.5 degrees C. per one second and after it reached 220 degrees C., heating process was performed during 55 seconds at temperature over 220 degrees C. The solder ball had the composition of 96.5Sn-3.0Ag-0.5Cu and a diameter of 0.3 mm.
(b) Decision Criteria
O: The diameter of the spread solder was 0.45 mm or more.
X: The diameter of the spread solder was less than 0.45 mm
(2) Regarding Evaluation of Reinforcing Effect
(a) Evaluation Method
Flux was supplied to a substrate, solder ball was mounted on the flux supplied to the substrate and was reflowed, and then, a test referred to as a sharing test was performed to share the solder ball and the flux residue from the substrate using measuring tool and force required for the shear was measured. As an apparatus therefor, SERIES 4000 made by Dage Japan Corporation was used. The force required for the shear, which is measured in the shearing test, is referred as shear strength. The solder ball had the composition of 96.5Sn-3.0Ag-0.5Cu and a diameter of 0.3 mm.
(b) Decision Criteria
O: The shear strength was 4N or more.
X: The shear strength was less than 4N.

In the executed examples 1 through 3, the mixtures of the long-chain dibasic acid mixture in each of which the long-chain dibasic acid mixture shown in the above-mentioned compositions (1) through (4) was mixed at a predetermined proportion were added at proportions shown in the following Table 1.

To the comparison example 1, no long-chain dibasic acid mixture added to each executed example was added. To the comparison example 2, the long-chain dibasic acid mixture having an addition amount that was smaller than the prescribed addition amount thereof in each executed example was added. To the comparison example 3, the long-chain dibasic acid mixture having an addition amount that was larger than the prescribed addition amount thereof in each executed example was added. In the comparison example 4, the addition amount of the long-chain dibasic acid mixture was equal to that of the executed example 1 but no epoxy resin was added thereto. To the comparison example 5, no long-chain dibasic acid mixture was added but adipic acid as organic acid was added using Roll mill.

TABLE 1

|  | Executed Example 1 | Executed Example 2 | Executed Example 3 | Comparison Example 1 | Comparison Example 2 | Comparison Example 3 | Comparison Example 4 | Comparison Example 5 |
|---|---|---|---|---|---|---|---|---|
| Epoxy Resin | 40 | 40 | 30 | 40 | 40 | 25 |  | 40 |
| Long-chain dibasic acid mixture | 40 | 20 | 60 |  | 10 | 70 | 40 |  |
| hardened castor oil | 2 | 2 | 2 | 2 | 2 | 2 | 2 | 2 |
| Rosin |  |  |  |  |  |  | 40 |  |
| Organic Acid (Adipic Acid) |  |  |  |  |  |  |  | 40 |
| Solvent | 17 | 37 | 7 | 57 | 47 | 2 | 17 | 17 |
| Hardening | 1 | 1 | 1 | 1 | 1 | 1 | 1 | 1 |
| Solder Wettability | 0.5 | 0.46 | 0.52 | 0.31 | 0.34 | 0.51 | 0.54 | 0.42 |
| Reinforcing Effect | 4.83 | 4.26 | 4.19 | 1.85 | 4.09 | 3.12 | 3.08 | 4.34 |
| Solder Wettability | O | O | O | X | X | O | O | X |
| Reinforcing Effect | O | O | O | X | O | X | X | O |

In the flux of the executed example 1 where the long-chain dibasic acid mixture of 40% in which the long-chain dibasic acid mixture shown in the above-mentioned compositions (1) through (4) was mixed at a predetermined proportion, the epoxy resin of 40% and other compounds at proportions shown in the following Table 1 were added, the diameter of the spread solder was 0.50 mm and the shear strength was 4.83N. It has found out that excellent solder wettability and reinforcing effect are obtained.

Further, in the flux of the executed example 2 where the long-chain dibasic acid mixture of 20%, the epoxy resin of 40% and other compounds at proportions shown in the following Table 1 were added, the diameter of the spread solder was 0.46 mm and the shear strength was 4.26N. It has found out that excellent solder wettability and reinforcing effect are also obtained in the executed example 2.

Additionally, in the flux of the executed example 3 where the long-chain dibasic acid mixture of 60%, the epoxy resin of 30% and other compounds at proportions shown in the following Table 1 were added, the diameter of the spread solder was 0.52 mm and the shear strength was 4.19N. It has found out that excellent solder wettability and reinforcing effect are also obtained in the executed example 3.

In contrast, in the flux of the comparison example 1 where no long-chain dibasic acid mixture added in each executed example was added and a proportion of the epoxy resin was 40%, which was similar to the executed example 1, the diameter of the spread solder was 0.31 mm and the shear strength was 1.85N. It has found out that any desired solder wettability and reinforcing effect are not obtained. From the results of the respective executed examples and the comparison example 1, it is conceivable that the addition of long-chain dibasic acid mixture to the flux contributes to the improvement in the solder wettability and shear strength.

In the flux of the comparison example 2 where a proportion of the long-chain dibasic acid mixture was 10%, which was smaller than the proportions prescribed in the respective executed examples, and a proportion of the epoxy resin was 40%, which was similar to the executed example 1, the diameter of the spread solder was 0.34 mm and the shear strength was 4.09N. It has found out that the shear strength satisfies a desired requirement to obtain the reinforcing effect but any desired solder wettability is not obtained.

In the flux of the comparison example 3 where a proportion of the long-chain dibasic acid mixture was 70%, which was larger than the proportions prescribed in the respective executed examples, and a proportion of the epoxy resin was 25%, which was smaller than the proportions prescribed in the respective executed examples, the diameter of the spread solder was 0.51 mm and the shear strength was 3.12N. It has found out that the diameter of the spread solder satisfies a desired requirement to obtain the desired solder wettability but the shear strength is low so that the desired reinforcing effect is not obtained.

From the results of the respective executed examples and the comparison examples 2 and 3, it has found out that the addition of long-chain dibasic acid mixture to the flux contributes to the improvement in the solder wettability and when an addition amount of the long-chain dibasic acid mixture is increased, the solder wettability tends to be improved.

On the other hand, it has found out that the addition of long-chain dibasic acid mixture to the flux contributes to the improvement in the shear strength to obtain the reinforcing effect but when an addition amount of the long-chain dibasic acid mixture is increased and an addition amount of the epoxy resin is relatively decreased, the shear strength tends to be deteriorated.

In the flux of the comparison example 4 where a proportion of the long-chain dibasic acid mixture was 40%, which was similar to the executed example 1, and no epoxy resin was added, the diameter of the spread solder was 0.54 mm and the shear strength was 3.08N. It has found out that the diameter of the spread solder satisfies a desired requirement to obtain the solder wettability but the shear strength is low so that the desired reinforcing effect is not obtained.

From the result of the comparison example 4, it has found out that even if the long-chain dibasic acid mixture is added, the shear strength is low unless the epoxy resin is added. Accordingly, from the results of the comparison examples 1 and 4, the addition of suitable amounts of the long-chain dibasic acid mixture and the epoxy resin to the flux contributes to the improvement in the reinforcing effect.

In the flux of the comparison example 5 where no long-chain dibasic acid mixture was added, adipic acid as organic acid of 40% was added, and a proportion of the epoxy resin was 40%, which was similar to the executed example 1, the diameter of the spread solder was 0.42 mm and the shear strength was 4.34N. It has found out that the shear strength satisfies a desired requirement to obtain the reinforcing effect but any desired solder wettability is not obtained.

From the above-mentioned results, it has found out that in the flux to which the epoxy resin as thermosetting resin is added, no rosin is added, the long-chain dibasic acid mixture is added in place of the organic acid which has been added to a conventional flux, the solder wettability is improved and the reinforcing effect by the flux residue is obtained.

It, however, has found out that when an addition amount of the long-chain dibasic acid mixture is little, the solder wettability tends to be deteriorated while when the addition amount of the long-chain dibasic acid mixture is much, the shear strength tends to be deteriorated. Therefore, in this invention, content of the epoxy resin is set to be 30% through 40% and content of the long-chain dibasic acid mixture is set to be 20% through 60%. It has found out that this enables the excellent solder wettability and reinforcing effect to be obtained.

Further, the flux of this invention is applicable to a conductive adhesive. The conductive adhesive refers to adhesive in which the flux and the conductive metal powder are kneaded and mixed, the adhesive being used for adhering at a temperature that is lower than a melting point of the metal powder. In the conductive adhesive, conductive metal powder is densely contacted to each other when the resin is hardened by heating so that the circuit board and various kinds of electronic components are joined without melting the conductive metal powder, which is different from the solder paste.

INDUSTRIAL AVAILABILITY

The present invention is applied to a flux by which a substrate and electronic component(s) or the like can be securely bonded with flux residue.

The invention claimed is:

1. A flux comprising:
    thermosetting resin; and
    long-chain dibasic acid mixture being added as a hardening agent for hardening the thermosetting resin and an activator;
    wherein the long-chain dibasic acid mixture is mixture of the long-chain dibasic acid mixture of compounds having following compositions (1), (2), (3) and (4); and
    wherein proportion of whole of the mixture is sset to be 100 mass %, the proportion of the long-chain dibasic acid shown in compositions (1) through (4) is as follows:
    (1) 2-methyl nonanedioic acid of 30 mass % through 60 mass %;
    (2) 4-(methoxycarbonyl)- 2,4-dimethyl undecanedioic acid of 8 mass % through 20 mass %;
    (3) 4,6-bis(methoxycarbonyl)-2,4,6-trimethyl tridecanedioic acid of 8 mass % through 20 mass %; and
    (4) 8,9-bis(methoxycarbonyl)-8,9-dimethyl hexadecanodioic acid of 15 mass % through 30 mass %.

2. The flux according to claim 1 characterized in that a solvent of 0.1 mass % through 40 mass % is added into the flux.

3. The flux according to claim 1 characterized in that content of the thermosetting resin in the flux is 30 mass % through 40 mass % and content of the long-chain dibasic acid mixture in the flux is 20 mass % through 60 mass %.

4. The flux according to claim 3 characterized in that a solvent of 0.1 mass % through 40 mass % is added into the flux.

5. A solder paste characterized in that in the solder paste, a flux and solder alloy powder are mixed, the flux containing:

thermosetting resin; and long-chain dibasic acid mixture being added as a hardening agent for hardening the thermosetting resin and an activator;

wherein the long-chain dibasic acid mixture is mixture of the long-chain dibasic acid mixture of compounds having following compositions (1), (2), (3) and (4); and when proportion of whole of the mixture is set to be 100 mass %, the proportion of the long-chain dibasic acid shown in the compositions (1) through (4) is as follows:

(1) 2-methyl nonanedioic acid of 30 mass % through 60 mass %;
(2) 4-(methoxycarbonyl)-2,4-dimethyl undecanedioic acid of 8 mass % through 20 mass %:
(3) 4,6-bis(methoxycarbonyl)-2,4,6-trimethyl tridecanedioic acid of 8 mass % through 20 mass %; and
(4) 8,9-bis(methoxycarbonyl)-8,9-dimethyl hexadecanodioic acid of 15 mass % through 30 mass %.

6. The solder paste according to claim 5 characterized in that content of the thermosetting resin in the flux is 30 mass % through 40 mass % and content of the long-chain dibasic acid mixture in the flux is 20 mass % through 60 mass %.

* * * * *

UNITED STATES PATENT AND TRADEMARK OFFICE
CERTIFICATE OF CORRECTION

PATENT NO. : 9,902,022 B2
APPLICATION NO. : 15/128231
DATED : February 27, 2018
INVENTOR(S) : Masashi Uehata et al.

It is certified that error appears in the above-identified patent and that said Letters Patent is hereby corrected as shown below:

In the Claims

Column 8, Line 43, Claim 1, delete "sset" and insert -- set --

Column 8, Line 49, Claim 1, delete "4-(methoxycarbonyl)- 2,4-dimethyl" and insert -- 4-(methoxycarbonyl)-2,4-dimethyl --

Column 9, Line 15, Claim 5, delete "%:" and insert -- %; --

Signed and Sealed this
Twenty-second Day of May, 2018

Andrei Iancu
*Director of the United States Patent and Trademark Office*